(12) United States Patent
Kaiser et al.

(10) Patent No.: US 8,021,560 B2
(45) Date of Patent: Sep. 20, 2011

(54) METHOD FOR PRODUCING A RADIATION-ABSORBING OPTICAL ELEMENT AND CORRESPONDING RADIATION ABSORBING OPTICAL ELEMENT

(75) Inventors: Norbert Kaiser, Jena (DE); Antje Kaless, Jena (DE); Peter Munzert, Jena (DE); Michael Scheler, Jena (DE); Ulrike Schulz, Jena (DE)

(73) Assignee: Fraunhofer-Gesellschaft zur Foerderung der Angewandten Forschung E. V., Munich (DE)

( * ) Notice: Subject to any disclaimer, the term of this patent is extended or adjusted under 35 U.S.C. 154(b) by 1003 days.

(21) Appl. No.: 11/662,550

(22) PCT Filed: Sep. 8, 2005

(86) PCT No.: PCT/DE2005/001572
§ 371 (c)(1),
(2), (4) Date: Mar. 12, 2007

(87) PCT Pub. No.: WO2006/026975
PCT Pub. Date: Mar. 16, 2006

(65) Prior Publication Data
US 2008/0118760 A1    May 22, 2008

(30) Foreign Application Priority Data
Sep. 10, 2004 (DE) .......... 10 2004 043 871

(51) Int. Cl.
*B44C 1/22* (2006.01)

(52) U.S. Cl. .......... 216/22; 216/37; 359/359; 359/360; 359/586

(58) Field of Classification Search .......... 216/22, 216/37; 359/359, 360, 586
See application file for complete search history.

(56) References Cited

U.S. PATENT DOCUMENTS

| 4,389,452 | A | * | 6/1983 | Chahroudi et al. | 428/215 |
| 4,634,635 | A | | 1/1987 | Shiraishi et al. | |
| 4,960,310 | A | | 10/1990 | Cushing | |
| 5,068,021 | A | | 11/1991 | Sichmann et al. | |
| 5,337,191 | A | * | 8/1994 | Austin | 359/885 |
| 5,400,317 | A | | 3/1995 | Strasser et al. | |
| 6,391,462 | B1 | | 5/2002 | Jang | |

FOREIGN PATENT DOCUMENTS

| DE | 295 935 | 10/1983 |
| DE | 38 18 341 A1 | 12/1988 |

(Continued)

OTHER PUBLICATIONS

H. Bartzsch et al. Surface and Coatings Technology, vol. 180-191, (2004), pp. 616-620.*

(Continued)

*Primary Examiner* — Nadine G Norton
*Assistant Examiner* — Maki A Angadi
(74) *Attorney, Agent, or Firm* — Slater & Matsil, L.L.P.

(57) ABSTRACT

In a process for the fabrication of a radiation-absorbing optical element that contains a substrate (1) of plastic, a layer with a graduated refractive index (4) is fabricated on at least one surface (2) of the substrate (1) using a plasma etching process, after which a metal layer (7) is applied on top of the layer with a graduated refractive index (4).

12 Claims, 5 Drawing Sheets

FOREIGN PATENT DOCUMENTS

| | | |
|---|---|---|
| DE | 689 10 731 T2 | 6/1994 |
| DE | 197 20 974 C1 | 7/1998 |
| DE | 101 52 412 A1 | 8/2002 |
| DE | 102 41 708 A1 | 3/2004 |
| EP | 0 347 727 | 12/1989 |
| EP | 0 718 418 B1 | 9/1995 |
| FR | 2 592 063 | 12/1986 |
| GB | 2045283 * | 10/1980 |
| JP | 60-225101 | 11/1985 |
| JP | 61-110101 | 5/1986 |
| JP | 05 045503 A | 2/1993 |
| WO | WO 2004/092789 A | 10/2004 |

OTHER PUBLICATIONS

Fujikawa et al., "Antireflection surface modification of plastic CR-39 by means of $^{16}$O- and $^{35}$Cl-ion bombardment", Optik Wissenschaftliche Verlag GmbH, Stuttgart, DE, vol. 84, No. 1, pp. 1-5, Jan. 1990.

H. Neff, "Optical Properties of ultrarough silver films on silicon", Journal of Applied Physics, vol. 80, No. 2, pp. 1058-1062, Jul. 15, 1996.

Ohser-Wiedemann et al., "Abscheidung von schwarzen oxidkeramischen Funktionsschichten auf beliebigen Tragermaterialien", Galvanotechnik, May 2004.

N. Bityurin et al., "UV laser modifications and etching of polymer films (PMMA) below the ablation threshold", Applied Surface Science 109/110, pp. 270-274, 1997.

Ohser-Wiedemann, V.R., et al., "Abscheidung von schwarzen oxidkeramischen Funktionsschichten auf beliebigen Trägermaterialien," Galvonotechnik, May 2004, 7 pages. English abstract included.

* cited by examiner

METHOD FOR PRODUCING A RADIATION-ABSORBING OPTICAL ELEMENT AND CORRESPONDING RADIATION ABSORBING OPTICAL ELEMENT

RELATED APPLICATIONS

This is a U.S. national stage of application No. PCT/DE2005/001572, filed on Sep. 8, 2005.

This patent application claims the priority of German patent application no. 10 2004 043 871.4 filed Sep. 10, 2004, the disclosure content of which is hereby incorporated by reference.

FIELD OF THE INVENTION

The invention concerns a method for the manufacture of a radiation-absorbing optical element and a radiation-absorbing optical element.

BACKGROUND OF THE INVENTION

In the context of this invention, a radiation-absorbing optical element is understood to refer both to a partially absorbing optical element and to one that absorbs, at least approximately, all the radiation. Partially absorbing optical elements are used, for instance, as optical filters for specifically controlled light reduction, in particular as color-neutral filters. Optical elements that absorb incident radiation almost entirely are also called black layers, and are used, for instance, in sensor technology in both the visible and near-infrared spectral ranges, in particular for pyroelectric sensors.

One method of manufacturing black layers consists of coating a surface with the aid of a very sooty flame of organic gas, such as acetylene. The thickness and the evenness of black layers created in this way, however, are often unsatisfactory. The surface, moreover, is strongly heated, which is particularly disadvantageous when delicate sensors are located behind the surface.

In another method a black layer is created from a porous metal layer by evaporating a metal such as silver in a low vacuum of about 1.33 mbar. Porous metal layers of this type, however, often only have limited long-time stability.

It is also known that metal layers can be converted through anodic oxidation or through plasma-chemical oxidation into black ceramic oxide layers. These, however, have undesirably high reflection values in the near-infrared spectral range, and can only be created on metallic or similarly temperature-stable and chemically resistant substrates.

The creation of a black player through the application of multiple layers of different compositions is known from FR-A-2 592 063. The first layer here is formed of a material from either group 4A or 5A of the periodic table of elements, followed by a nitride layer and a carbide layer of the same element. The sequence of layers is completed by a layer containing carbon.

The use of a black layer as a decorative coating is described in U.S. Pat. No. 4,634,635. This describes coating the surface of an ornament with SiC using a plasma-supported CVD process in which the surface is heated to a high temperature during the coating process. A method of this type is therefore not suitable for coating temperature-sensitive plastics.

DE 689 10731 T2 describes an absorptive coating created by cathode atomization (sputtering). Targets containing, for instance, a mixture of oxygen nitrides of aluminum and titanium are used. The manufacture of targets of this type, however, is expensive and involves considerable costs.

DE 102 41 708 A1 describes the use of a plasma ion source to generate a layer having a graduated refractive index that reduces the interface reflections of a plastic substrate.

SUMMARY OF THE INVENTION

One object of the invention is to provide an improved method for the manufacture of a radiation-absorbing optical element, presenting relatively little manufacturing difficulty and which, in particular, can be applied to relatively temperature-sensitive plastic substrates.

Another object of the invention is to provide a radiation-absorbing optical element that features high long-time stability and a low spatial variation in the optical properties of absorption, transmission and reflection.

These and other objects are attained in accordance with one aspect of the invention directed to a radiation-absorbing optical element containing a substrate of plastic is manufactured by creating a layer with a graduated refractive index on at least one surface of the substrate, and then applying a metal layer to the layer with a graduated refractive index.

The layer with a graduated refractive index has the advantage of sharply reduced reflection in comparison with a conventional plastic surface where, as a result of the relatively low roughness, the transition of the refractive index of the surrounding medium approximates to a step.

The thickness of the produced layer with a graduated refractive index, within which the refractive index varies in a direction perpendicular to the surface of the substrate, is favourably 50 nm or more, with a thickness of even 200 nm or more being preferred.

It is, for instance, possible to achieve reflection of less than 1.5% in the layer with a graduated refractive index created on the substrate in the spectral range between 400 nm and 1100 nm. Due to the roughness of the interface, there is almost no specular reflection, while only a small proportion at the most of the light that is incident on the surface of the substrate undergoes diffuse reflection.

If we consider a beam of light that, from the substrate side, crosses the metal layer applied on the substrate, the total of the transmission T, the absorption A, and the reflection R must, due to conservation of energy, have a total of one; in other words $T+R+A=1$. Since the reflection R at the interface between the substrate and the metal layer can be reduced to a very low value by the layer with a graduated refractive index that is created in the first stage of the process, the absorption $A=1-T-R$ is determined primarily by the transmission T through the metal layer.

The transmission T of the metal layer can favourably be varied by varying the thickness of the metal layer. By applying, for instance, a metal layer with the thickness of 200 nm or more it is possible to reduce the transmission T of the metal layer to a value that is negligible in comparison with 1, as a result of which very high values can be achieved for the absorption A.

It is in particular possible in this way to fabricate a black layer that almost totally absorbs incident light. The mean absorption over the spectral range from 200 nm up to 800 nm can favourably reach 98% or more. In the UV spectral range from 200 nm to 380 nm it is even possible to achieve a mean absorption of more than 99%.

The invention is not restricted to the fabrication of black layers with such high levels of absorption. Rather, it is possible by varying the thickness of the metal layer to adjust the transmission T, and therefore the absorption A, to almost any desired value. It is in this way also possible to fabricate partially absorbing layers that can, in particular, be used as color-neutral filters having a defined value of absorption A. In order to manufacture a partially absorbing layer of this type it is possible, for instance, to apply a metal layer with a thickness between 2 nm and 100 nm on top of the substrate carrying the layer with a graduated refractive index.

Because high reproducibility and very good homogeneity in the thickness of the metal layer over the surface that is to be coated can be achieved with modern coating processes, a particularly good homogeneity and reproducibility in the optical properties of the radiation-absorbing optical element can also be achieved by the method of manufacture in accordance with the invention. Favourably, the metal layer is applied by sputtering. As an alternative, other coating processes are also, of course, suitable.

The applied metal layer can, specifically, contain silver, gold or aluminum.

The layer with a graduated refractive index at the surface of the substrate is favourably created by roughening the plastic substrate so that the layer with a graduated refractive index extends from the surface of the substrate into the substrate itself. The layer with a graduated refractive index favourably extends into the substrate down to a depth of 50 nm or more, 200 nm or more being particularly favourable.

The layer with a graduated refractive index on the surface or surfaces of the plastic substrate is favourably created by means of a plasma etching process. The plasma etching process can be carried out in a vacuum vaporization plant that includes a plasma ion source. Plasma ion sources of this type are usually used in the manufacture of optical layers in order, by giving the substrate a preliminary treatment through ion bombardment and/or an additional application of energy through ion bombardment during the coating process, to achieve favourable growth conditions, in particular in order to deposit layers with low roughness and to improve adhesion of the layers to the substrate. Because vacuum vaporization plants for the manufacture of optical layers often already have a plasma ion source, no further fitting or conversion work would be necessary in such cases in order to implement the method in accordance with the invention.

The plasma etching process is favourably carried out in an argon plasma and it is favourable for oxygen to be added to the plasma. It is particularly favourable for approximately 20 sccm or 40 sccm of oxygen to be added. In order to create the layer with a graduated refractive index, the energy of the ions should be 100 eV or more, and the duration of the plasma etching process should be 200 seconds or more. By means of the plasma etching process it is favourably possible for the surface of the plastic substrate to be roughened in such a way that a layer with a graduated refractive index extends into the substrate to a depth of 50 nm or more, preferably even 200 nm or more. Further details of the plasma etching process may be found in DE 102 41 708 A1, whose content is incorporated here by reference.

In a favourable version of the invention, a layer with a graduated refractive index is not only created on the surface of the plastic substrate provided for application of the metal layer, but also on an opposite surface of the substrate. This can be done, for instance, by treating the front and rear faces of a plastic substrate one after another with the plasma etching process. In this way, an antireflective surface opposite the absorbing metal layer can be produced with relatively little effort. This antireflection treatment increases the absorption of the optical element, since radiation that otherwise is reflected from the rear face of the substrate opposite the metal layer does not pass through the substrate to the subsequent absorbing metal layer where it is absorbed.

The method in accordance with an embodiment of the invention is particularly suitable for plastic substrates that contain PMMA (polymethylmethacrylate), CR39 (diethyleneglycol bis alkylcarbonate) or other polymers containing methylmethacrylate. Because the method in accordance with an embodiment of the invention is comparatively fast, simple and cost-effective, and also has a high fault tolerance, it is also suitable for mass produced parts.

The method in accordance with the invention is particularly suitable for the manufacture of absorbers for pyroelectric sensors or for absorbers that are used in the construction of optical devices as radiation traps or for the absorption of stray light.

The application of a radiation-absorbing element in accordance with the invention may, further, be considered as a decorative layer for consumer items, such as a clock face. Favourably, the metal layers that are applied also exhibit sufficient electrical conductivity for a variety of sensor applications.

DETAILED DESCRIPTION OF THE DRAWINGS

Elements that are the same or that have the same effect are given the same reference numbers on the figures.

The method of manufacture of a radiation absorbing optical element is initially explained with the aid of the intermediate steps schematically illustrated in FIGS. 1A, 1B, 1C and 1D.

Figure 1A:
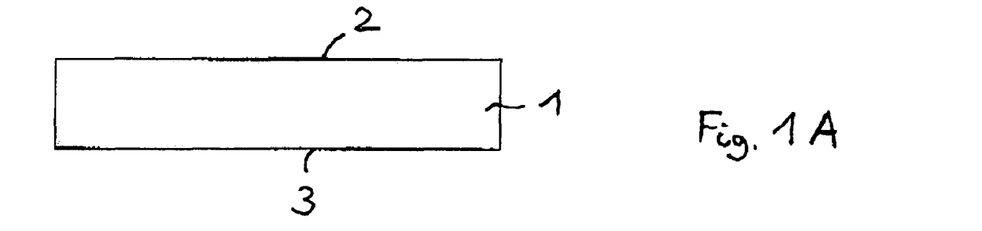
FIGS. 1A, 1B, 1C and 1D: a schematic illustration of an example implementation of a method in accordance with the invention, showing four intermediate steps.

FIG. 1A shows a plastic substrate 1, containing for instance; PMMA or CR39, having a front face 2 and a rear face 3. The surface roughness of a substrate of this type is typically on the scale of 1 nm or less, and the reflectivity in air is approximately 4%.

Figure 1B:
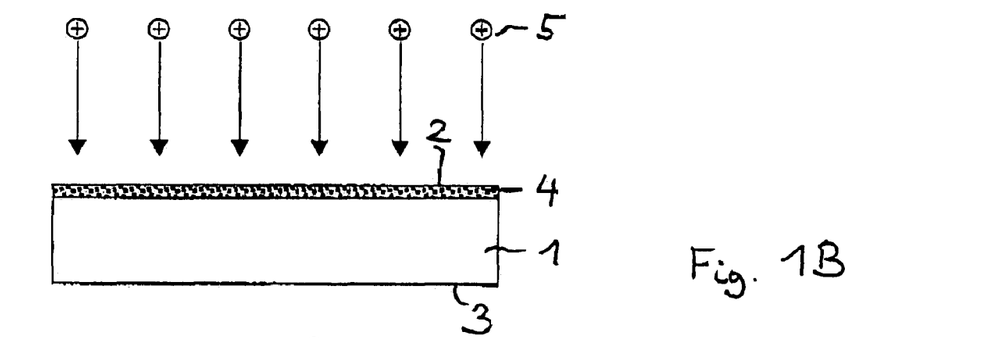

In the process step illustrated schematically in FIG. 1B, a layer with a graduated refractive index 4 is produced on the front face 2 of the substrate 1 by a plasma etching process, in which the substrate 1 is bombarded with ions 5. In order to generate the layer with a graduated refractive index 4, the plastic substrate 1 is roughened by the plasma etching process. The layer with a graduated refractive index 4 created on the surface 2 extends from the surface 2 of the substrate into the substrate 1. Favourably, the layer with a graduated refractive index extends to a depth of 50 nm or more, and it is particularly favourable for it to extend even 200 nm or more into the substrate.

A vacuum vaporization plant of Type APS904 manufactured by Leibold Optics is, for instance, suitable for carrying out the plasma etching process. After one or more substrates 1 have been fitted into the plant, it is typically evacuated down to about $7*10^{-6}$ mbar. An argon plasma with the pressure of approximately $3*10^{-4}$ mbar is then created, to which about 30 sccm of oxygen are added. By applying a voltage of at least 100 V, ions are accelerated with a respective energy of at least 100 eV to the substrate. After an etching period of, for instance, about 300 seconds the surface of the substrate has been roughened in such a way that it has a layer with a graduated refractive index 4, within which the refractive index varies from the surface 2 of the substrate down to a depth of more than 200 nm.

Figure 1C:
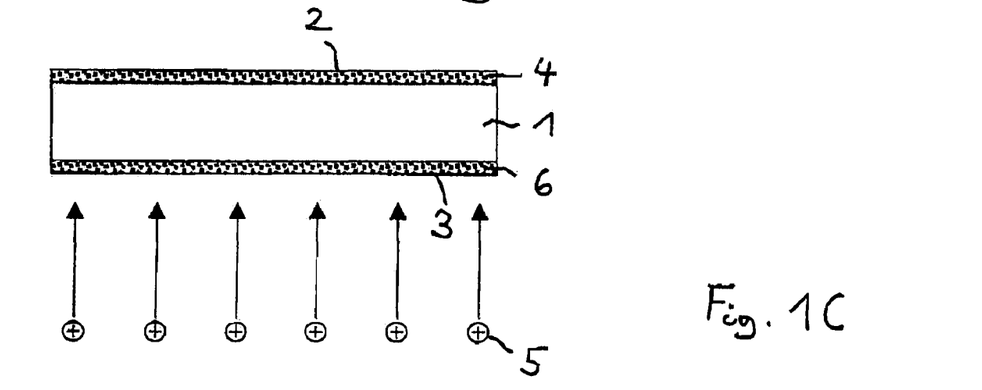

In a favourable implementation of the method in accordance with the invention, as shown in FIG. 1C, a second layer with a graduated refractive index 6 is also fabricated on the rear face 3 opposite the front face 2 using the plasma etching process described above. This is advantageous for applications in which the rear face 3 of the substrate 1 must also exhibit the lowest possible reflection.

Figure 1D:
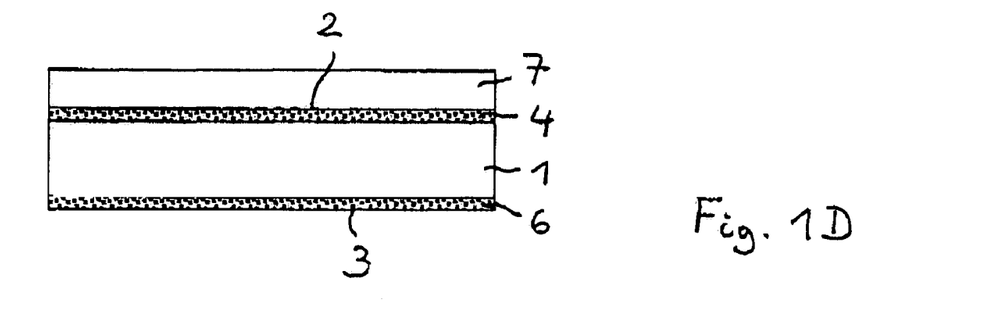

In the subsequent procedural step illustrated in FIG. 1D a metal layer 7 is applied to the layer with a graduated refractive index 4 on the front face, containing, for instance, aluminum, silver or gold. The metal layer is favourably applied by sputtering. Depending on the thickness of the metal layer, optical elements that are partially absorbing or almost totally absorbing can be fabricated.

Figure 2:
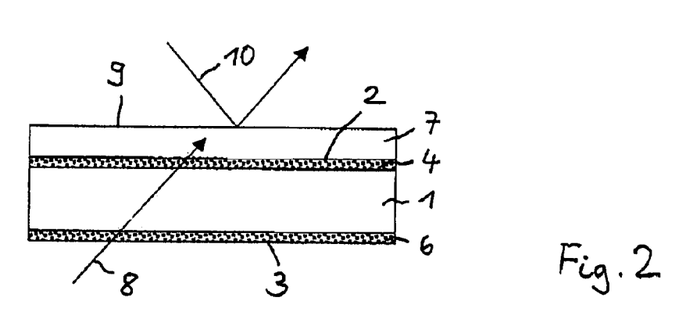
FIG. 2: a schematic illustration of the cross-section through a first example of an implementation of a radiation-absorbing optical element in accordance with the invention.

FIG. 2 shows a first example of an implementation of a radiation-absorbing optical element in accordance with the invention, in which a layer of gold 7 approximately 200 nm thick was applied to the front face 2 of a 1 mm thick PMMA substrate 1 that has layers with a graduated refractive index 4, 6 on both the front surface 2 and on the rear surface 3.

This example implementation involves a black layer that almost entirely absorbs radiation 8 arriving from the substrate side. As a result of the layers with a graduated refractive index 4, 6 created by the plasma etching process, the front surface 2 and the rear surface 3 of the substrate 1 exhibit particularly low reflection. Radiation 8 that is incident on the radiation-absorbing optical element from the rear face 3 of the substrate 1 is therefore favourably only reflected to a very low degree at the interface 3 between a surrounding medium, such as air, and the substrate 1 and at the interface between the substrate 1 and the metal layer 7. The radiation therefore almost entirely enters the gold layer 7. Because the transmission in the gold layer 7, due to its thickness of about 200 nm, is also extremely low, the radiation 8 is almost entirely absorbed in the gold layer 7. From the rear face 3 of the substrate 1 the gold layer 7 therefore appears to be matt black.

The surface 9 of the gold layer 7 that faces away from the substrate 1 on the other hand exhibit a non-negligible reflection R, as a result of which radiation 10 incident on the surface 9 is at least partially reflected by the gold layer 7.

Figure 3:
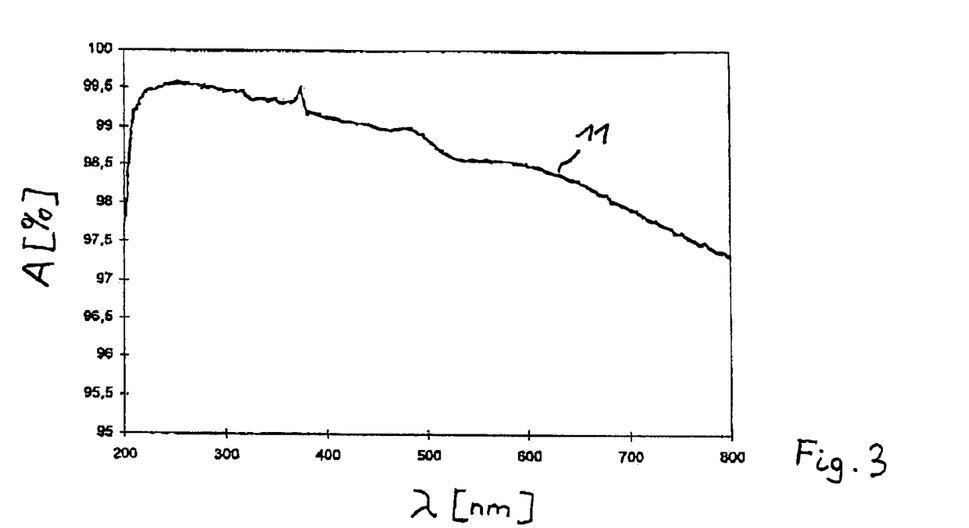
FIG. 3: a graphical representation of an absorption spectrum of the radiation-absorbing optical element for the first example of an implementation of the invention.
Figure 4:
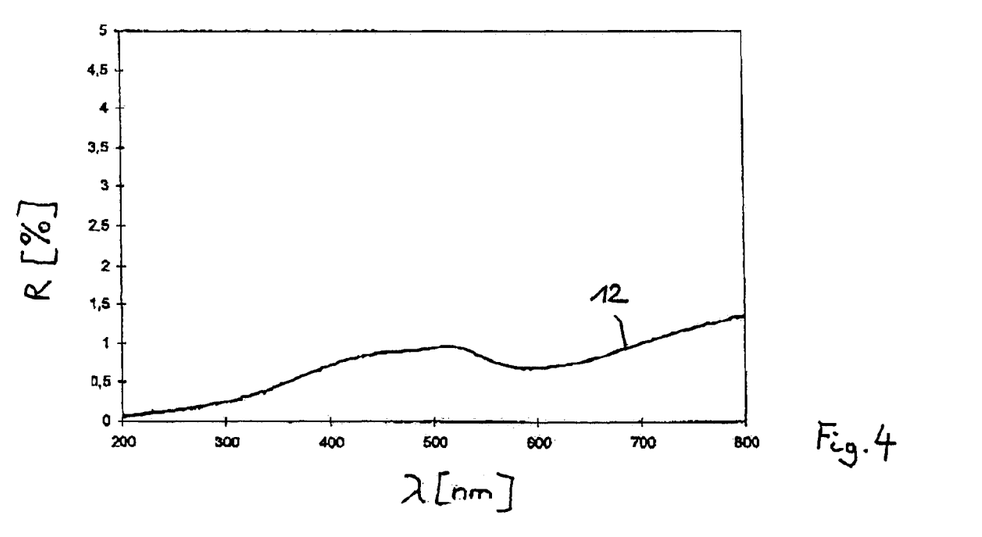
FIG. 4: a graphical representation of a reflection spectrum of the rear of the gold layer, facing toward the substrate, of the radiation-absorbing optical element in the first example of an implementation of the invention.
Figure 5:
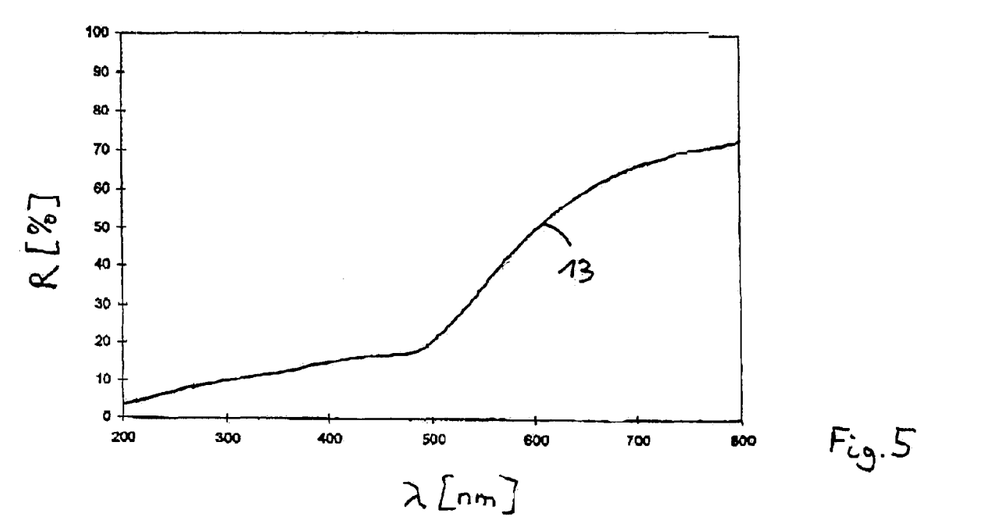
FIG. 5: a graphical representation of a reflection spectrum of the front of the gold layer, facing away from the substrate, of the radiation-absorbing optical element in the first example of an implementation of the invention.

FIG. 3, FIG. 4 and FIG. 5 illustrate the absorption and reflection spectra of the first example of an implementation of the invention in the spectral range between 200 nm and 800 nm.

The absorption spectrum 11 illustrated in FIG. 3 for radiation 8 incident from the rear 3 of the substrate 1 was determined with the aid of a scattered light sphere. In the ultraviolet part of the spectrum from 200 nm to 380 nm, the mean absorption is more than 99%. Over the full measuring range from 200 nm to 800 nm, the mean absorption is 98.3%.

The reflection spectrum 12 illustrated in FIG. 4 for the rear face 3, that is the face of the substrate 1 facing away from the metal layer 7, has a mean reflection in the visible spectral range of less than 1%.

The reflection spectrum 13 for the surface 9 of the 200 nm thick gold layer on the front face 2 of the substrate of the first example of an implementation shown in FIG. 5 shows in contrast the high reflection in the visible spectral range typical for a metal layer.

Figure 6:
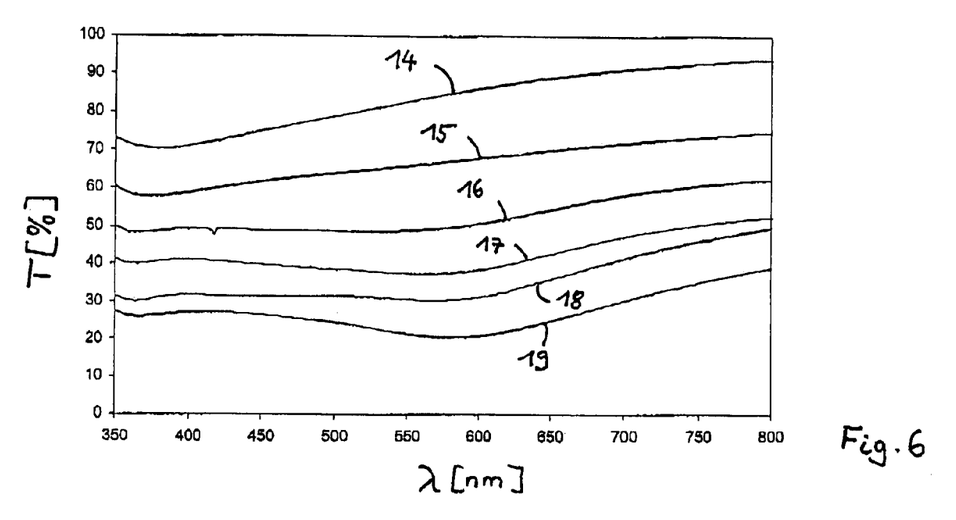
FIG. 6: a graphical representation of the transmission spectra of six further examples of implementation of the invention.

FIG. 6 illustrates the transmission spectra of 6 further examples of implementation of the invention, in which the metal layer 7 applied is in each case a layer of silver of different thicknesses on a 1 mm thick substrate 1 of PMMA, on each face of which a layer with a graduated refractive index 4, 6 has been applied. The thickness of the applied silver layer is 10 nm on Curve 14, 20 nm on Curve 15, 30 nm on Curve 16, 40 nm on Curve 17, 50 nm on Curve 18 and 60 nm on Curve 19. This illustration of the transmission T in relationship to the wavelength λ for various thicknesses of the silver layer illustrates the fact that the method in accordance with the invention can be used to implement optical filters with various values for the transmission T by varying the thickness of the metal layer 7.

Figure 7:
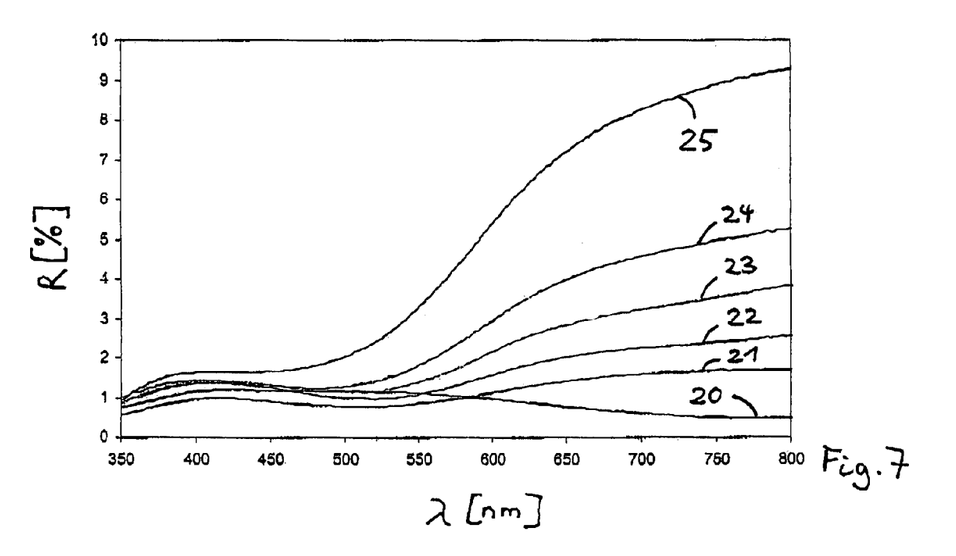
FIG. 7: a graphical representation of reflection spectra of the rear sides of the silver layers facing toward the substrate for the 6 examples of implementation of the invention.

FIG. 7 illustrates the reflection R in relationship to the wavelength λ of the six examples of implementation mentioned above having various thicknesses of the silver layer for radiation incident on the face of the silver layer that faces the substrate. Curve 20 illustrates the reflection R for the silver layer that is 10 nm thick, Curve 21 represents the thickness of 20 nm, Curve 22 the thickness of 30 nm, Curve 23 the thickness of 40 nm, Curve 24 the thickness of 50 nm and Curve 25 for the thickness of 60 nm. The graphical illustration of the comparison of the wavelength-dependent reflection shows that by varying the thickness of the metal layer the reflection, particularly in the visible spectral range, can be varied.

Figure 8:
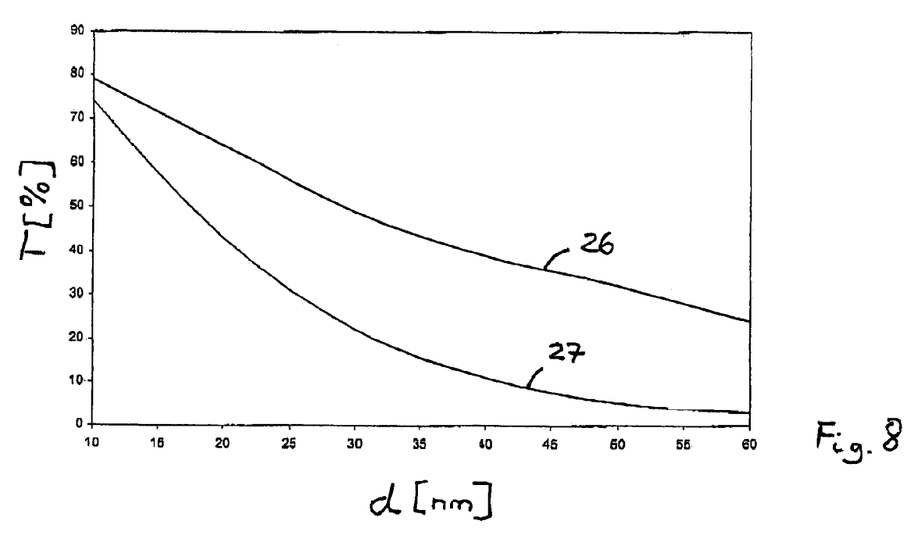
FIG. 8: a graphical representation of the transmission T of an example of implementation of a radiation-absorbing optical element in accordance with the invention having a silver layer, and for a silver layer applied to a conventional substrate, in dependency on the thickness of the silver layer.

FIG. 8 shows on Curve 26 the transmission T in relationship to the thickness d of a silver layer that is applied in accordance with the invention on a substrate having a layer with a graduated refractive index, while Curve 27 shows the transmission T in relationship to the thickness of a silver layer that has been applied to a conventional substrate. The comparison illustrates that the transmission T for a radiation-absorbing optical element manufactured in accordance with the invention drops more slowly as the thickness of the layer increases than is the case with metal layers applied to conventional substrate. This makes the manufacture of optical filters with defined transmission easier, since the shallower gradient of the curve yields a greater fault tolerance in the thickness of the applied metal layer.

The invention is not restricted to the description given in the context of the example implementations. Rather, the invention covers any new feature or any combination of features, most particularly any combination of features in the patent claims, even if this feature or this combination itself is not explicitly quoted in the patent claims or in the example implementations.

The invention claimed is:

1. A method for the manufacture of a radiation-absorbing optical element that includes a substrate of plastic, the method comprising:
   forming a layer with a graduated refractive index on at least one surface of the substrate, wherein the layer with a graduated refractive index is formed by roughening the plastic substrate with a plasma etching process, so that the graduated refractive layer extends into the substrate; and
   subsequently applying a metal layer onto the layer with the graduated refractive index.

2. A method in accordance with claim 1, wherein the layer with a graduated refractive index extends from the surface of the substrate down to a depth of at least 50 nm into the substrate.

3. A method in accordance with claim 1, wherein the substrate is bombarded by ions having an energy of at least 100 eV during the plasma etching process.

4. A method in accordance with claim 1, wherein the plasma etching process is carried out in an argon plasma, and oxygen is added to the plasma.

5. A method in accordance with claim 1, wherein the plasma etching process lasts at least 200 seconds.

6. A method in accordance with claim 1, wherein the metal layer has a thickness of at least 200 nm.

7. A method in accordance with claim 1, wherein the metal layer has a thickness between 2 nm and 100 nm inclusive.

8. A method in accordance with claim 1, wherein the metal layer contains silver, gold or aluminum.

9. A method in accordance with claim 1, wherein the metal layer is applied by sputtering.

10. A method in accordance with claim 1, wherein a first layer with graduated reflective index is created on a front surface of the substrate and a second layer with graduated reflective index is applied to a rear surface of the substrate.

11. A method in accordance with claim 1, wherein the substrate contains PMMA or CR39.

12. A method in accordance with claim 1, wherein the layer with a graduated refractive index fabricated on the surface of the substrate has a reflection that is less than 1.5% in the spectral range from 400 nm up to 1100 nm inclusive.

* * * * *